United States Patent [19]

Moses et al.

[11] Patent Number: 5,476,251

[45] Date of Patent: Dec. 19, 1995

[54] AXLE BRACKET PROVIDING IMPROVED SUPPORT

[75] Inventors: David G. Moses, Decatur; Anil K. Bansal, Fort Wayne, both of Ind.

[73] Assignee: Dana Corporation, Toledo, Ohio

[21] Appl. No.: 290,480

[22] Filed: Aug. 15, 1994

[51] Int. Cl.⁶ .................................................. B60G 11/26
[52] U.S. Cl. ........................... 267/52; 280/688; 280/713; 180/905
[58] Field of Search .......................... 280/711, 713, 280/725, 688; 180/905, 349, 352, 378; 267/52

[56]  References Cited

U.S. PATENT DOCUMENTS

| | | | |
|---|---|---|---|
| 1,872,394 | 8/1932 | Bleicher | 219/93 |
| 1,955,824 | 4/1934 | Mogford et al. | 74/607 |
| 2,204,287 | 6/1940 | Wilber | 74/607 |
| 3,386,724 | 6/1968 | Tantlinger et al. | 267/52 |
| 3,398,946 | 8/1968 | Mathers | 267/52 |
| 3,437,333 | 4/1969 | Koch et al. | 267/52 |
| 3,547,215 | 12/1970 | Bird | 280/713 |
| 4,234,120 | 11/1980 | Pringle | 228/173.6 |
| 4,545,452 | 10/1985 | Moring et al. | 180/78 |
| 4,566,719 | 1/1986 | Van Denberg | 280/711 |
| 4,693,486 | 9/1987 | Pierce et al. | 280/80.1 |
| 5,240,280 | 8/1993 | Raidel | 280/688 |

*Primary Examiner*—Margaret A. Focarino
*Assistant Examiner*—Paul N. Dickson
*Attorney, Agent, or Firm*—Oldham & Oldham, Co.

[57]  ABSTRACT

A bracket for fastening an axle housing to a suspension beam of a vehicle comprises a base with a pair of upwardly extending opposing walls. The base is configured to be secured to the lower portion of the axle housing and is provided with apertures for receiving fasteners attached to the suspension beam. Each of the opposing walls is configured such that they frictionally engage the lower channel portion of the lateral walls of the axle housing. Each opposing wall also has a upper surface suitable for welding to the lateral wall of the axle housing near the channel seam weld and an aperture through the wall for welding the wall to the fractionally engaged lateral wall. The top surface of each opposing wall is rounded off at each end to facilitate placement of a weld that extends down onto the lower portion of the axle housing. The welding aperture on each wall is preferably an elongate slot, especially one where the elongate dimension of the slot is parallel to the top surface and has rounded ends.

5 Claims, 2 Drawing Sheets

AXLE BRACKET PROVIDING IMPROVED SUPPORT

The present invention relates to a bracket for suspending an axle, particularly a drive axle, of a vehicle from the vehicle suspension system. More particularly, the invention relates to such a bracket wherein the bracket is provided pressfit pads, each having an aperture in a side wall to provide a site for additional welding to support the lower channel of the axle housing and to reduce stress at the seam weld attachment of the bracket on the axle housing.

BACKGROUND OF THE INVENTION

It is well known to attach an axle of a vehicle, particularly the drive axle, which is normally contained in an axle housing, to the vehicle suspension system, particularly a beam in the vehicle suspension. In such vehicles, a square axle housing is typically welded to a bracket which is in turn secured to the vehicle suspension structure. The weldment securing the axle housing to the bracket is usually made at the mid-point of the side where vertical bending moment stresses are neutral. However, these areas experience high-torsional loading which results from brake torque, vehicle roll, and diagonal axle (wheel) walk. The welding at the mid-point of the axle housing typically introduces a point of weakness where axle housing failure may initiate. The weakness in the typical axle housing welded to a bracket is caused in part by the undesirable heat-treating effects of the welding process upon the axle housing material in the localized area adjacent the weldment. In addition, craters or strike marks may form points at which cracks may initiate or at which stresses may become concentrated. The typical axle housing is welded to the bracket by a seam weld across the top surface of the bracket. Because it is a line weld, the weldment has ends at which stresses are concentrated where cracks may initiate. Also, the typical axle housing is difficult to install because the axle housing must be held in place against the axle bracket while extensive welding takes place. This structure both increases assembly time and increases the heat of welding which results in undesirable localized heat treatment of the base metal. While it is known in the prior art to use the walls of the bracket to compress the side walls of the axle housing to form a press fit prior to placement of the seam weld, the typical bracket is affixed to the axle housing only along the seam weld on the top surface of the bracket. This may result in additional stress to the seam weld, with concomitant premature failure of the seam weld.

SUMMARY OF THE INVENTION

A primary aspect of the invention is to prevent premature stress failure of the seam weld attachment, thereby prolonging the life expectancy of the fitting.

This and other advantages of the present invention are achieved by a bracket for fastening an axle housing to a suspension beam of a vehicle, comprising a base and a pair of opposing walls. The base is configured to be secured to the lower portion of the axle housing and is provided with apertures for receiving fasteners attached to the suspension beam. The pair of opposing walls extend upwardly from the base, and each is configured to frictionally engage the lower channel portion of the lateral walls of the axle housing. Each opposing wall further has a upper surface suitable for welding to the lateral wall of the axle housing near the channel seam weld and an aperture therethrough for welding the wall to the frictionally engaged lateral wall. Preferably, the top surface is rounded off at each end, to facilitate extension of the weldment down onto the lower portion of the axle housing, thereby increasing support of that member. The preferred aperture on the opposing wall is an elongate slot, especially one that has an elongate dimension parallel to the top surface and rounded ends.

BRIEF DESCRIPTION OF THE DRAWINGS

Further aspects and features of the present invention are revealed in the accompanying detailed description of the preferred embodiment of the invention and the accompanying drawings, where identical parts are indicated by identical reference numerals, and wherein.

DETAILED DESCRIPTION OF THE DRAWINGS

Figure 1:
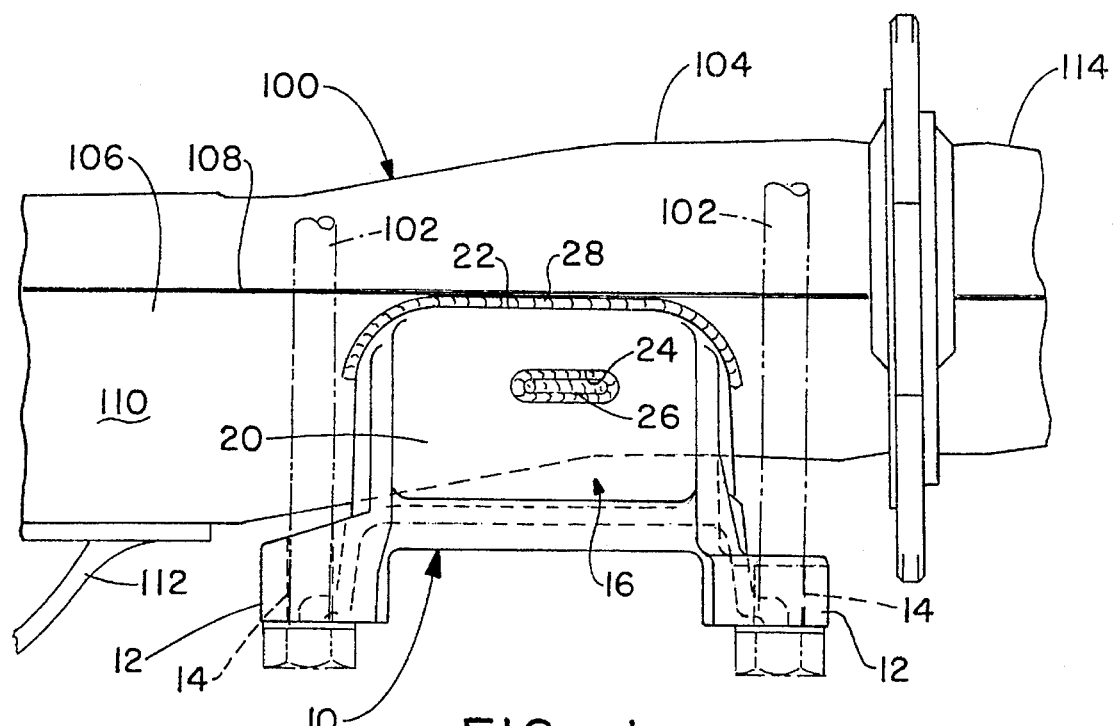
FIG. 1 shows a side elevational view of the axle housing bracket of the present invention, as positioned on a typical axle housing.
Figure 2:
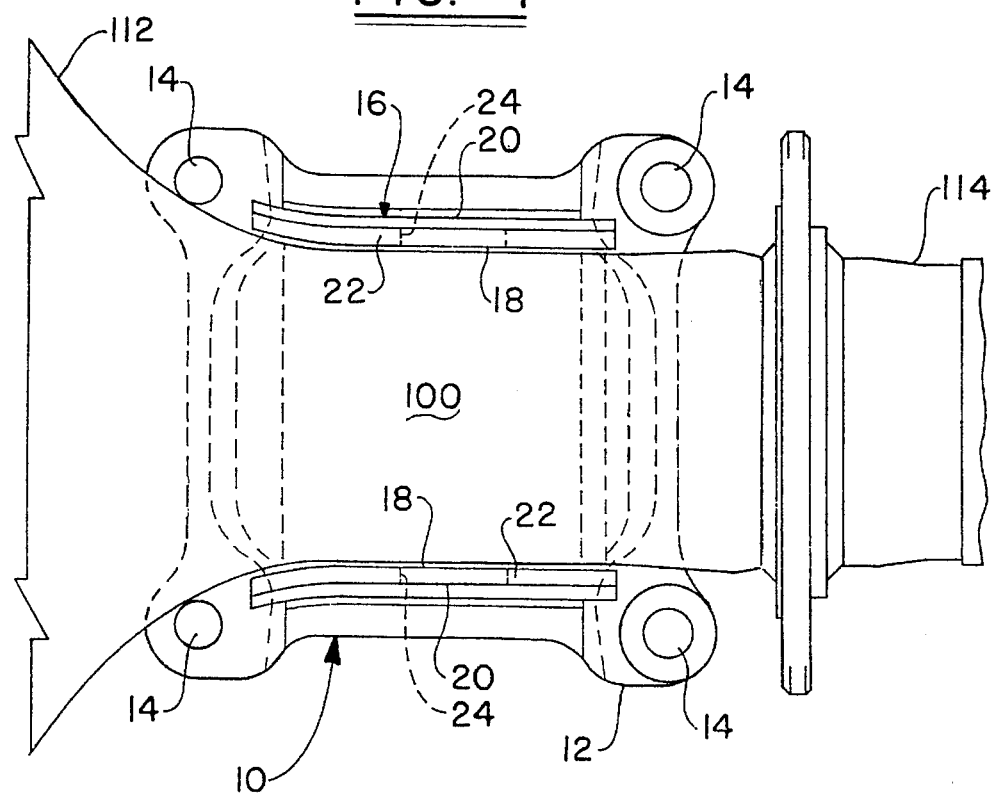
FIG. 2 shows a top plan view of the axle housing bracket of the present invention, as positioned on a typical axle housing.

Better understanding of the invention will be obtained by referring to the drawings and FIGS. 1 and 2 in particular, where the bracket 10 of the present invention is shown on an axle housing 100 of a vehicle from a side and a top view, respectively. The bracket 10 serves to suspend the axle housing 100 from a suspension beam (not shown) by a plurality of fastening members 102 extending from a suspension beam (not shown) to a base 12 of the bracket. An end of each fastening member 102 passes through an aperture 14 in the base 12, where it may be affixed by conventional means, such as the threaded fastener shown in FIG. 1. In this manner, the ground-engaging wheels (not shown) of the vehicle are suspended from the vehicle suspension system. When the axle being suspended by the bracket 10 is a drive axle, the axle shaft itself is enclosed in the axle housing 100. Typically, such an axle housing 100 comprises an upper channel member 104 and a lower channel member 106, the two channel members connected to each other by a longitudinally-extending seam weld 108, typically near the mid-line of the lateral walls 110 formed by placing the upper and lower channel members 104, 106, into registration. As shown in FIGS. 1 and 2, the bracket 10 is typically placed between the differential cup 112, which houses the differential, and the wheel hub 114. While the present invention is described for a drive axle contained in an axle housing 100, it will be understood that the present invention is equally applicable to suspending a non-drive axle from the vehicle suspension system, in which case the attachment of the bracket 10 will be directly to the axle itself. In this latter case the axle will commonly be a hollow axle with a square cross section, although it could be a solid axle with a round cross section, or another variation on this as is known in the art.

As will be described more fully below, the bracket 10 of the present invention comprises the base 12 having a plurality of apertures 14 and a pair of opposing walls 16 extending upwardly from the base. As shown in FIGS. 1 and 2, each of the opposing walls 16 is configured to frictionally engage the lower channel member 106 of the axle housing 100 when it is pressed into place from below the lower channel member. This frictional engagement is enhanced by a curvature of the inner and outer surface 18 and 20, respectively, of each opposing wall 16, so that the opposing wall effectively acts as if it is a convex surface bearing upon the lateral wall 110. Each of the opposing walls also has an upper surface 22 suitable for placement of a weld attaching the bracket 10 to the lateral wall 110 near the channel seam weld 108. Each of the opposing walls 16 also has a window aperture 24 therethrough for providing a weld site to affix the opposing wall 16 directly to the frictionally engaged lateral wall 110. This aperture 24 is used to place a puddle weld 26 that affixes the opposing wall inner surface 18 to the lower channel member 106 and closes any gaps that exist between the opposing wall inner surface and the lower channel member. This puddle weld 26 will typically be made prior to the line weld 28 placed along the upper surface 22, so that the bracket 10 is constrained from movement relative to the axle housing 100 while the line weld is made along the upper surface.

Figure 5:
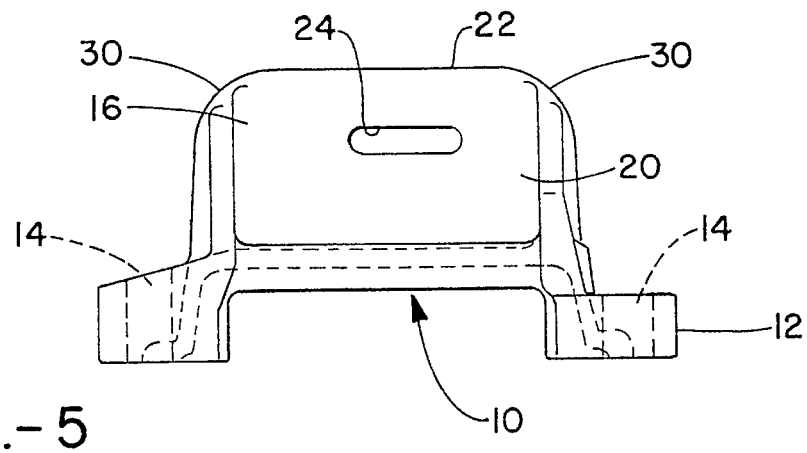
FIG. 5 shows a side elevational view of the axle housing bracket of FIG.5, as shown along Line 5—5 in FIG. 1.

As shown in FIG. 5, the ends 30 of the upper surface 22 are rounded off. When the line weld 28 is applied to the upper surface 22, the line weld starts at the beginning of one rounded end and continues to the end of the other rounded end. In this manner, the weld 28 does not run just parallel to or atop the seam weld 108. Instead, it runs down onto the lower channel member 106 and provides strong support to the lower channel member.

Figure 3:
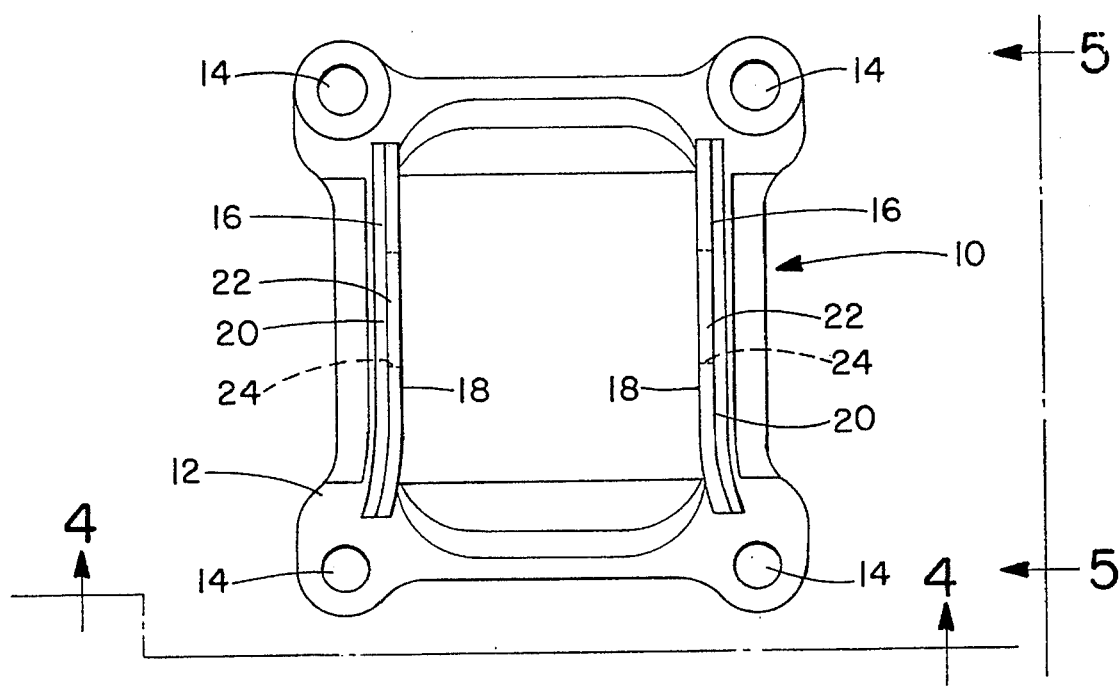
FIG. 3 shows a top plan view of the axle housing bracket of the present invention.
Figure 4:
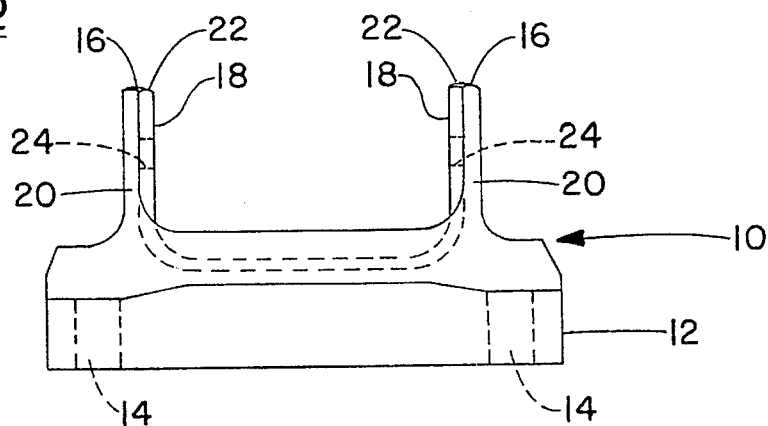
FIG. 4 shows an end elevational view of the axle housing bracket of FIG. 3, as viewed along Line 4—4 in FIG. 3.

The exact details of the bracket 10 are best understood by reference to FIGS. 3–5, which show the bracket of the present invention isolated from the axle housing in top, end and side views, respectively. FIG. 3 shows the bracket 10 from a top plan view, from which the base 12 is clearly illustrated. The base 12 is essentially a rectangular framework with an aperture 14 positioned at each corner thereof. In the preferred embodiment illustrated in the drawings, the base 12 is thicker at one end than at the other, resulting in deeper apertures at that end. This difference is most clearly shown in FIG. 5, where the left end of the base 10 is shown as being thicker than the right end. This thicker left end is intended for placement adjacent to the differential cup, as shown in FIGS. 1 and 2, and serves to quickly indicate proper placement of the bracket 10 when fitting it to an axle housing 100.

The bracket 10 is preferably formed by casting. When the bracket 10 is cast, the base 12 has a pair of opposing walls 16 that extend upwardly from two of the opposing sides of the base framework. As best shown in the top view presented in FIG. 2, the opposing walls 16 are shaped to correspond to the curvature of the axle housing 100 near the differential cup 112. Since a frictional engagement of the opposing walls 16 with the lateral walls 110 of the axle housing 100 is intended, the opposing walls are further defined after casting by a finishing process such as machining, to achieve closer tolerance on the separation of the opposing walls and to provide a smoother surface. Each of the opposing walls 16 has a window aperture 24 through it, positioned essentially centrally on the wall, as best shown in FIG. 3. In the preferred embodiment, the window aperture 24 is an elongate slot, particularly an elongate slot where the elongate dimension is parallel to the top surface of the opposing wall.

In the most preferred embodiment, the ends of the elongate slot are rounded. In the preferred embodiment, the slot has a length to width ratio of about 4:1, based upon the length along the longitudinal axis, including the rounded ends.

A further feature of each of the opposing walls 16 is the rounding of the ends 30 of the top surface 22. As noted above, the top surface 22 provides a site for welding the bracket 10 to the axle housing 100, particularly near or actually atop the seam weld 108 affixing the upper and lower channel members 104, 106, that form the axle housing. By rounding off the ends 30 of the top surface 22 as shown in FIG. 5 so that each end is effectively a quarter circle arc with a smooth tangential transition to the top surface and the wall side, the length of the line weld 28 may be increased by as much as 57% from that available when the ends are squared off.

Although the present invention is shown in FIGS. 1 and 2 with the bracket 10 of the present invention being applied to one side of the axle housing 100 extending from a differential cup 112 to the wheel hub 114, it will be readily understood that a mirror image bracket would be similarly applied to the other side of the axle housing extending from the same differential cup to the other wheel hub in a mirror image fashion.

While the best mode and preferred embodiment of the present invention have been described to comply with the requirements of the Patent Office, the invention is not limited thereto, but is instead to be measured by the scope and the spirit of the appended claims.

What is claimed is:

1. In a drive axle assembly for a vehicle, a drive axle housing fastened to a suspension beam of the vehicle, the drive axle housing comprising an upper channel and a lower channel attached to each other by a seam weld such that the upper channel and lower channel constitute a pair of lateral walls with the seam weld running therealong, the drive axle housing being fastened to the suspension beam by an improved bracket, wherein the improved bracket comprises:

a base, upon which rests the lower channel of the drive axle housing, the base provided with apertures, each said aperture adapted for receiving a fastening member attached to the suspension beam;

a pair of opposing walls extending upwardly from the base, each said opposing wall frictionally engaging the lower channel of the drive axle housing;

each said opposing wall having a first end and a second end with an upper surface therebetween, each said upper surface welded to each lateral wall of the lower channel of the drive axle housing near the channel seam weld; and each said opposing wall having a window aperture through which the opposing wall is welded to the frictionally engaged lower channel.

2. The bracket of claim 1 wherein the upper surface of each opposing wall is rounded off at each end thereof.

3. The bracket of claim 1 wherein the window aperture is a slot having a width dimension and a length dimension.

4. The bracket of claim 3 wherein the length dimension of the slot, is larger than the width dimension, and is parallel to the upper surface of the bracket.

5. The bracket of claim 3 wherein the slot has rounded ends.

\* \* \* \* \*